(12) United States Patent
Liu

(10) Patent No.: US 7,104,413 B2
(45) Date of Patent: Sep. 12, 2006

(54) CERAMIC METALLIC LIQUID HOLDING VESSEL

(75) Inventor: Yiu Ching Liu, Lake Oswego, OR (US)

(73) Assignee: Pacific Cornetta, Inc., Wilsonville, OR (US)

( * ) Notice: Subject to any disclaimer, the term of this patent is extended or adjusted under 35 U.S.C. 154(b) by 0 days.

(21) Appl. No.: 10/719,675

(22) Filed: Nov. 21, 2003

(65) Prior Publication Data

US 2005/0098565 A1 May 12, 2005

Related U.S. Application Data

(60) Provisional application No. 60/515,167, filed on Oct. 27, 2003.

(51) Int. Cl.
*B65D 23/02* (2006.01)
(52) U.S. Cl. .................................. 215/12.1
(58) Field of Classification Search .............. 215/12.1, 215/12.2, 12.3
See application file for complete search history.

(56) References Cited

U.S. PATENT DOCUMENTS

| | | | |
|---|---|---|---|
| 999,672 A | 8/1911 | Puffer | |
| 1,393,235 A * | 10/1921 | Mitrovich | 215/6 |
| 1,880,358 A * | 10/1932 | Payson et al. | 215/12.1 |
| 1,975,241 A | 10/1934 | Werber | |
| 3,618,807 A | 11/1971 | Rownd | |
| 3,745,290 A | 7/1973 | Hamden | |
| 3,766,975 A * | 10/1973 | Todd | 165/74 |
| 3,986,610 A * | 10/1976 | Hawn | 206/592 |
| 4,056,650 A | 11/1977 | Dates | |
| 6,050,443 A * | 4/2000 | Tung | 220/592.17 |

OTHER PUBLICATIONS

Photograph illustrating a ceramic product having threads made of sufficient tolerances to receive a fixed-size threaded cap.

* cited by examiner

*Primary Examiner*—Stephen Castellano
(74) *Attorney, Agent, or Firm*—Steven J. Adamson

(57) ABSTRACT

A vessel for holding liquid having an outer ceramic shell and an inner metallic lining. The metallic lining may extend over the top of the shell to provide protection from damage. A base member may be provided. The metallic material may be any food safe metal, including stainless steel and aluminum and alloys thereof. The ceramic may be any suitable ceramic including porcelain, earthenware and glass. Handle and non-handles vessels are disclosed as are resealable and non-resealable vessels. The metallic and ceramic materials may be separated by an insulative gap.

10 Claims, 2 Drawing Sheets

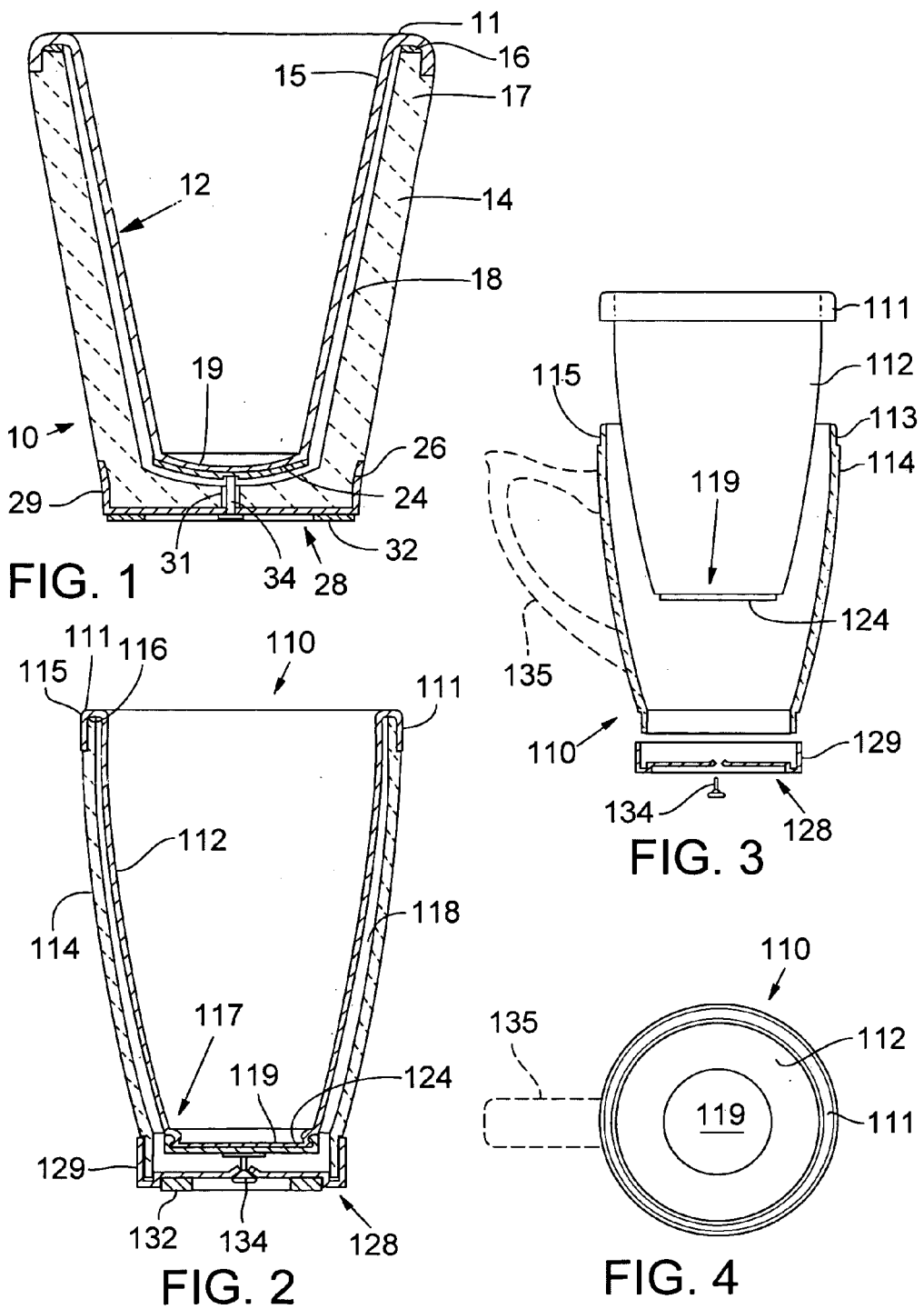

CERAMIC METALLIC LIQUID HOLDING VESSEL

CROSS REFERENCE TO RELATED APPLICATIONS

This application claims the benefit of U.S. Provisional Application No. 60/515,167, filed Oct. 27, 2003, and having the same title and inventor(s) as above.

FIELD OF THE INVENTION

The present invention relates to double walled vessels that hold liquid and other substances. Vessels of the present invention are well suited for use in drinking, serving, or storage, among other tasks. More specifically, the present invention relates to double walled vessels that employ an outer ceramic wall and an inner metallic wall.

BACKGROUND OF THE INVENTION

Ceramic vessels that are useful in holding liquid are known in the art. These include tea cups, coffee mugs, casserole dishes and serving trays, among other items. Disadvantageous aspects of ceramic vessels include that they chip or break relatively easily, provide little insulation and tend to stain with use.

Double walled vessels are also known in the art. These include stainless steel on stainless steel vacuum sealed vessels, stainless steel on plastic vessels and plastic on stainless steel vessels, among others.

Disadvantageous aspects of stainless steel on stainless steel (metal on metal) vessels includes that they are relatively expensive and difficult to print on. This is also true of stainless steel on plastic vessels (particularly with respect to printing). While a metal exterior may appear smooth and appealing, the ability to print on a surface is very important to add aesthetic aspects or to associate a vessel with a particular company or individual. For example, the sale or give away of printed coffee mugs and the like is an important part of the marketing efforts of many entities.

With respect to plastic on metal vessels, the plastic exterior may provide a more printable surface than stainless steel or permit insertion of a printed substrate between a transparent plastic outer shell and a metallic liner. Plastic on metal vessels are disadvantageous, however, in that they are generally perceived as looking "cheap," printing wears off the plastic shell during use and washing, they tend not to be dishwasher safe and tend to develop leaks or cracks between the plastic and metal. In addition, due to their fabrication process, the shape into which plastic may be shaped is limited without employing prohibitively expensive molds and fabrication techniques.

A need thus exists for a liquid holding vessel that provides good insulation, is relatively inexpensive to produce, that when printed on holds the printed text or image, and that is aesthetically pleasing, among other desired attributes.

SUMMARY OF THE INVENTION

The present invention overcomes the shortcomings of the prior art and provides other benefits with a double walled vessel having a ceramic outer wall or "shell" and a metal inner wall or "lining." The metal inner wall may lip over the top and/or a metal piece may be provided on the bottom of the ceramic shell to reduce chips and breaks, and potentially provide an aesthetic component. The ceramic and metallic materials may be gapped to provide insulation.

The metallic inner wall is a good thermal conductor (e.g., conducts the temperature of a beverage to the lips of a user), resists stains and is generally regarded as being easier to clean and sanitize. The ceramic shell provides an exterior surface that may be readily printed upon, that holds printing exceptionally well and when combined with stainless steel or like substances produces an elegant look.

Ceramic and metallic liquid holding vessels in accordance with the present invention may be configured as cups, bowls, plates, jars, trays, etc., for drinking, serving, storage or other purposes. They may be configured as resealable or non-resealable containers, and may find use in restaurant, household, laboratory, industrial or other environments.

These and related objects of the present invention are achieved by use of a ceramic metallic liquid holding vessel as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 1 is a cross-sectional view of one embodiment of a ceramic-metallic double walled liquid holding vessel in accordance with the present invention.

FIGS. 2–4 are a cross-sectional side view, an exploded side view and a top view, respectively, of another embodiment of a ceramic-metallic double walled liquid holding vessel in accordance with the present invention.

DETAILED DESCRIPTION

Figure 5:
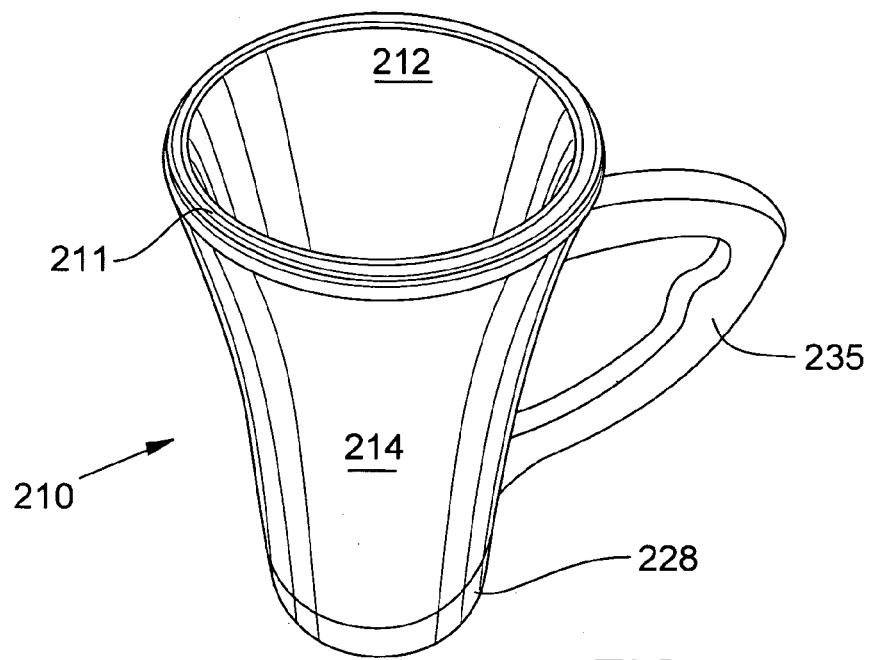
FIGS. 5–7 illustrate yet other embodiments of a double walled liquid holding vessel in accordance with the present invention.

Referring to FIG. 1, a cross-sectional view of a ceramic-metallic double walled liquid holding vessel 10 in accordance with the present invention is shown. Vessel 10 may include an inner wall or "lining" 12 that is preferably formed of a metallic material. Stainless steel is a suitable material, among others. Desirable characteristics of stainless steel include that it is durable, stain resistant, readily sanitizable (i.e., lends itself to a high degree of cleaning) and generally regarded as providing an elegant look. Alternative metallic materials include, but are not limited to, aluminum, titanium, cast iron, alloys thereof, and other food-safe metals.

Vessel 10 may also include an outer shell 14 that is preferably formed of a ceramic material. The ceramic material may include any non-metallic mineral whose formation procedure involves firing. Specific examples include earthenware, porcelain, stoneware and glass, though the present invention is not limited to these materials. Ceramic materials and formation techniques are known in the art. In one embodiment of the present invention, porcelain is used to fabricate shell 14.

In the embodiment of FIG. 1, lining 12 is inserted into shell 14. The top portion of lining 12 includes a flange or lip 11 that curves downward over the top edge 15 of shell 14. A gasket device 16, such as a silicone O-ring or another suitable device, may be provided between the top edge of the shell 14 and lining 12. The O-ring preferably creates an air and water tight seal.

While the shell and lining may be angled from vertical, shell 14 may include a collar 17 that has less of an angle from vertical, thereby creating a gap 18 between the shell and lining. Note that other configurations may be employed to form gap 18, including a circumferential bend in the metallic lining that reduces the lining diameter and/or a ledge formed in the interior face of the ceramic shell that spaces the shell from the lining, etc. Gap 18 may be an air gap or be filled with insulating material. Suitable insulating material such as insulating foam is known in the art. While gap 18 is optional, the separation of the metallic lining, a good thermal conductor, from the ceramic shell, a poor thermal conductor, provides insulation.

In one embodiment, gap 18 is 3 mm, lining 12 is 0.45 mm and ceramic shell 14 is 2.6 mm. The thickness of the gap may vary from 0 mm to 10 mm or more. The thickness of stainless steel material is preferably that of standard stainless steel linings, for example, of the type used in plastic on metal double walled vessels and may vary as known in the art. The width of the ceramic material may vary as appropriate for a given container shape and function or ceramic material type. The added structural strength of the metallic lining may permit the use of thinner ceramic walls than would typically be provided in the absence of such structural reinforcement, and vice versa.

The shell and lining are preferably configured relative to one another such that bottom portion 19 of the lining is positioned proximate a substantially complementary shaped portion of the shell. A plastic disk 24 may be provided on the underside of bottom portion 19. This disk may have a threaded metal member or other threaded or non-threaded fastener receiving member into which fastener 34 is inserted.

A metallic or non-metallic base plate 28 may optionally be provided at the bottom of shell 14. The base plate may have a lip or side walls 29 that extend upwardly on the outside of shell 14. The shell may have a recess 26 at side walls 29 such that the side walls are substantially flush with the exposed exterior face of the shell when the base member is mounted. Lining bottom portion 19 may be joined to base plate 28 by a screw 34 or other suitable fastener provided through hole 31 (formed in the ceramic material of the shell). Screw 34 essentially secures the lining to the shell.

A pad 32, formed of rubber, plastic, cork, or other suitable material, may be provided under base plate 28 to reduce skidding, etc. Base plate 28 may include a recess to accommodate pad 32.

The flange or lip 11 on the top of the ceramic material and the base plate 28 on the bottom of the ceramic material form a protective barrier that helps prevent chipping of the ceramic material. The flange on top also conducts the temperature of a beverage to the lip of a user.

While the use of screw 34 is one method of fixedly securing lining 12 to shell 14, it should be recognized that the lining and shell may be secured by other methods. One of these other methods is gluing. Glue may be applied at the top intersection (between flange 11 and top edge 15) and/or the bottom intersection (between bottom portion 19 and the interior bottom of the shell) of these two materials. Another securing method is compression fitting and/or folding or crimping of the metallic material onto the ceramic material. Yet another securing method is producing the ceramic material and metallic material with corresponding threads, and threading them onto one another. Note that some or all of these methods may be used in together.

For example, in the embodiment of FIG. 1, flange 11 may be compression fit onto top edge 15, while screw 34 may hold the lining within the shell and glue may join pad 32 to base plate 28.

Referring to FIGS. 2–4, a cross-sectional side view, an exploded side view and a top view of another embodiment of a ceramic metal liquid holding vessel 110 in accordance with the present invention is shown. Vessel 110 is different from vessel 10 in that the ceramic shell does not have a bottom. The shell 214 terminates on the bottom end proximate base member 128. The lining 112 may be provided in a manner similar to lining 12 of FIG. 1, and the other components: lip 111, seal member 116, gap 118, fastener base 124 (here shown "clipped" or pressure fit around a bottom circumferential protrusion 117), side walls 129, non-skid pad 132 and fastener 134 may be made as and may function as their counter parts in FIG. 1.

FIG. 3 illustrates an exploded view of vessel 110 of FIG. 3. Lining 112 fits into shell 114 such that lip 111 fits into recess 113 in shell top 115. The shell in turn is seated into base member 128 such that side walls 129 seat into circumferential recess 126. Fastener receiving member 124 is coupled to the lining and fastener 134 secures the base member, shell and lining. A handle 135 may be formed integrally with or added to shell 214 or be otherwise affixed to vessel 110 or other vessels herein.

FIG. 4 is a top view of vessel 110. The top lip 111, lining 112, lining bottom 119 and handle 135 are visible.

Referring to FIG. 5, a perspective view of another embodiment of a double walled drinking vessel 210 in accordance with the present invention is shown. Vessel 210 may include a metallic lining 212 similar to lining 12, a ceramic shell 214 similar to shell 14 and a base member 228 similar to base member 28. Vessel 210 presents a mildly fluted shape and has a handle 235. Vessel 210 may be constructed as described herein.

Figure 6:
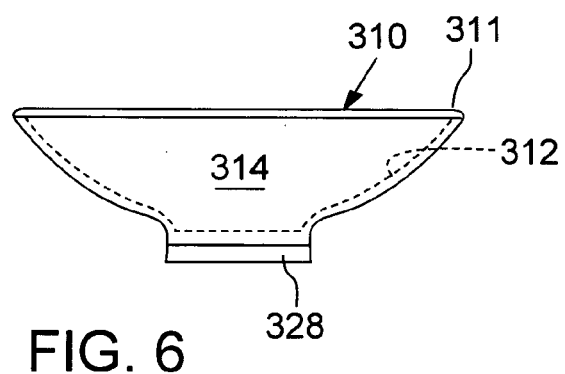

Referring to FIG. 6, a side view of another embodiment of a double walled drinking vessel 310 in accordance with the present invention is shown. Vessel 310 is a bowl that may be used from serving, mixing, storage or eating out of, etc. Vessel 310 may include a metallic lining 312 with lip 311, a ceramic shell 314, and a base member 328.

Figure 7:
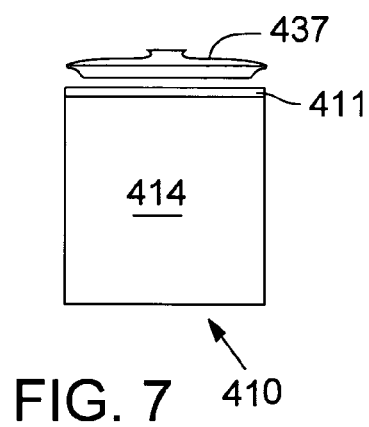

Referring to FIG. 7, a side view of yet another embodiment of a double walled drinking vessel 410 in accordance with the present invention is shown. Vessel 410 is a resealable storage container. It may serve as a cookie jar, a flour or sugar jar, a place to store sanitized medical instruments, among other applications. Vessel 410 includes a ceramic shell 414, a metallic lining (only lip 411 of which is visible) and a lid 437. Note that vessel 410 does not have side walls (such as side walls 29 of vessel 10, though these could be provided). FIG. 7 illustrates one of many possible design variations in this regard. Bowl 310 of FIG. 6 and storage container 410 of FIG. 7 may be manufactured as discussed herein.

It should be recognized that merely a few embodiments are discussed with reference to the figures, the present invention may take any of various other forms. For example, several components of the embodiment of FIG. 1 may be excluded without deviating from the present invention.

The present invention includes a vessel having a metallic lining and a ceramic shell. There may be a gap between these materials, though this is optional. The lining may extend over the top of the shell or not. A base plate may be provided, but is optional. The O-ring 11, fastener receiving or plastic plate 24, and pad 32 are also optional. In addition, the ceramic material (and the metallic material) may take many forms. The ceramic material, for example, may be molded, like any clay or pottery item or blown like glass, etc. In addition, lips and/or ledges may be formed on the interior surface of the shell or on the exterior surface of the lining to seat and gap the lining.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A double walled fluid holding vessel, comprising:
   a metallic lining having a wall and a bottom configured for holding a fluid;
   a ceramic shell consisting of fired nonmetallic mineral material and having a shell wall provided substantially about said metallic lining;
   a separate metallic base member that is provided at a base region of said vessel and fixedly secured to at least one of said ceramic shell or metallic lining, wherein said metallic lining and said metallic base member are made of one or more metallic materials from the group of metallic materials consisting of stainless steel, aluminum, titanium, tin, and alloys thereof; and
   a seal member provided at a top region of said vessel that forms an air and water tight seal between said lining and said shell;
   wherein said lining and shell are spaced so as to define a gap therebetween that provides a thermal insulative function;
   wherein said lining includes a lip member that extends at least in part over a top edge of said shell; and
   wherein said metallic lining is configured in a manner that does not include coupling to an induction heating electrode.

2. The vessel of claim 1, wherein the metallic material of said lining includes food-safe metallic materials.

3. The vessel of claim 1, wherein said fired nonmetallic mineral material includes one or more materials from the group including porcelain, stoneware, earthenware and glass.

4. The vessel of claim 1, wherein said lining has an overall vertical dimension that is greater than an overall horizontal dimension.

5. The vessel of claim 1, wherein said lining includes stainless steel and said shell includes porcelain.

6. The vessel of claim 1, wherein said base member is secured to said at least one of said shell wall and said lining in a manner that achieves a water tight seal.

7. The vessel of claim 1, wherein said ceramic shell is configured to define a bottom opening.

8. The vessel of claim 1, wherein said ceramic shell is configured to define a bottom located through opening.

9. The vessel of claim 1, wherein said fired nonmetallic mineral material includes one or more ceramic materials from the group of ceramic materials consisting of porcelain, stoneware and earthenware.

10. The vessel of claim 1, further comprising at least one of:
    a first peripherally disposed recess located at a top portion of said shell to receive said lip member; and
    a second peripherally disposed recess located at a bottom portion of said shell to receive said base member.

* * * * *